United States Patent [19]

Etheridge

[11] Patent Number: 4,756,781

[45] Date of Patent: Jul. 12, 1988

[54] METHOD OF CONNECTING NON-CONTAMINATING FLUID HEATING ELEMENT TO A POWER SOURCE

[76] Inventor: David R. Etheridge, 1733 Hiawatha Dr., Glendale, Calif. 91208

[21] Appl. No.: 913,505

[22] Filed: Sep. 29, 1986

[51] Int. Cl.[4] .............................................. B32B 31/26

[52] U.S. Cl. ........................................ 156/85; 156/86; 156/244.11; 156/293; 219/301; 219/306; 219/308; 219/322

[58] Field of Search ............. 156/85, 86; 174/DIG. 8; 219/301, 306, 307, 308, 322; 156/244.11, 293

[56] References Cited

U.S. PATENT DOCUMENTS

| | | | |
|---|---|---|---|
| 3,054,710 | 9/1962 | Nixon | 156/52 |
| 3,415,287 | 12/1968 | Heslop et al. | 174/DIG. 8 |
| 4,319,940 | 3/1982 | Arroyo et al. | 156/56 |
| 4,502,214 | 3/1985 | Miles et al. | 156/86 |
| 4,617,449 | 10/1986 | Weitzel et al. | 219/301 |

*Primary Examiner*—Caleb Weston

*Attorney, Agent, or Firm*—Kelly, Bauersfeld & Lowry

[57] ABSTRACT

A non-contaminating fluid heater includes a heater body having an inlet and an adjacent outlet at one end, a tube which channels entering fluids centrally through the heater body to a point distally spaced from the outlet, and a resistance heating element helically wound about the tube. A connector assembly permits lead wires to pass through the heater body, without inducing fluid leakage, for connecting the heating element to a power source. In order to form an environmental seal about the electrical connections, the heating element and the lead wires are each jacketed with a thermoplastic material, the wire and heating element portions adjacent the connection are surrounded by a sleeve of additional thermoplastic material, and this sleeve is, in turn, surrounded by thermally activated shrink tubing. By melting the thermoplastic materials surrounding the connections and heating the shrink tubing, the various layers of thermoplastic material are fused together to form a hermetic seal.

13 Claims, 3 Drawing Sheets

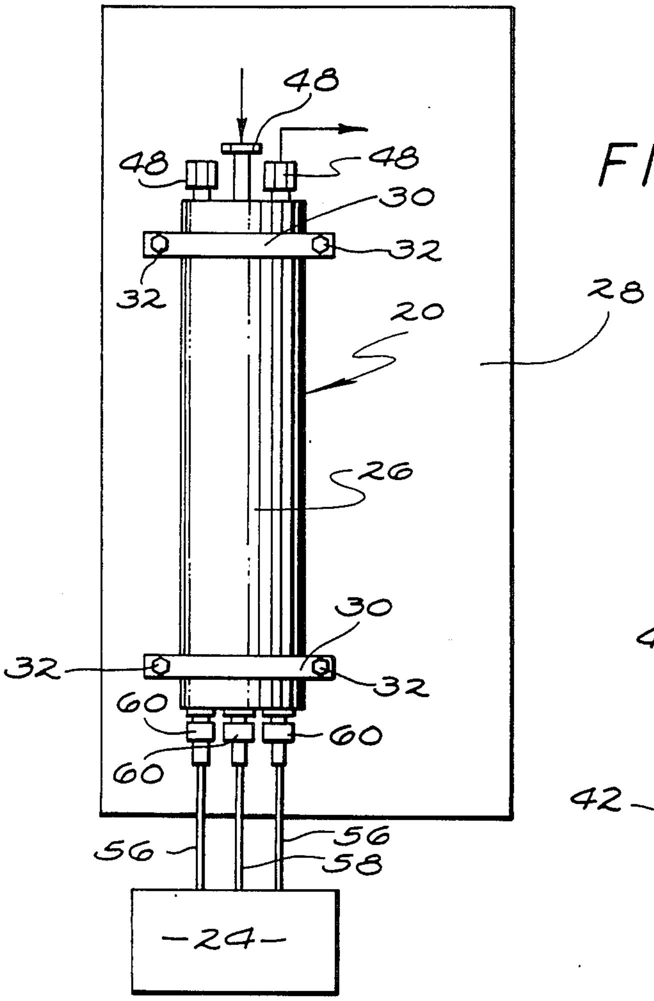
FIG. 1
FIG. 2
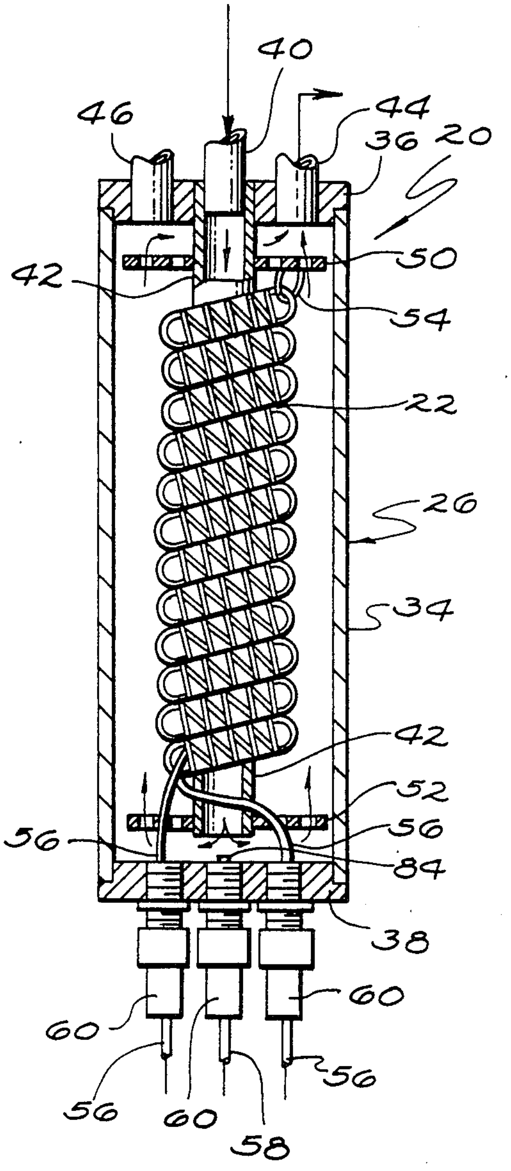
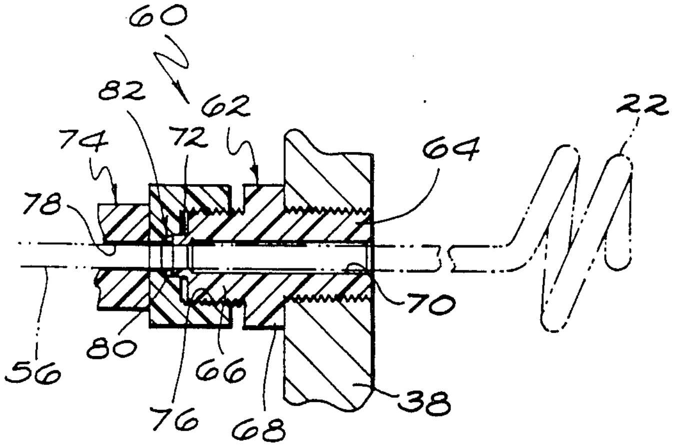
FIG. 10

FIG. 6
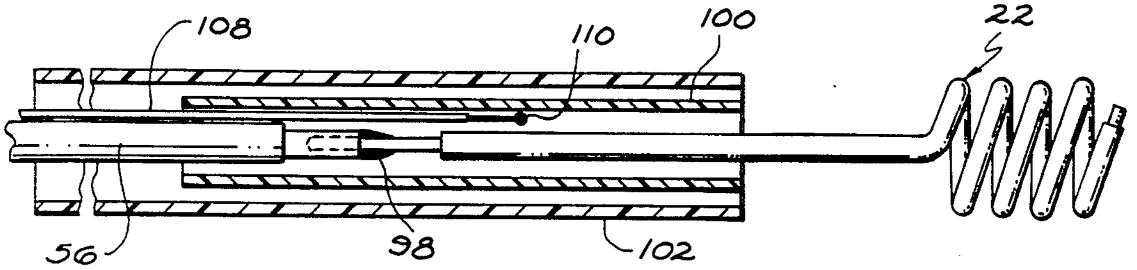
FIG. 7
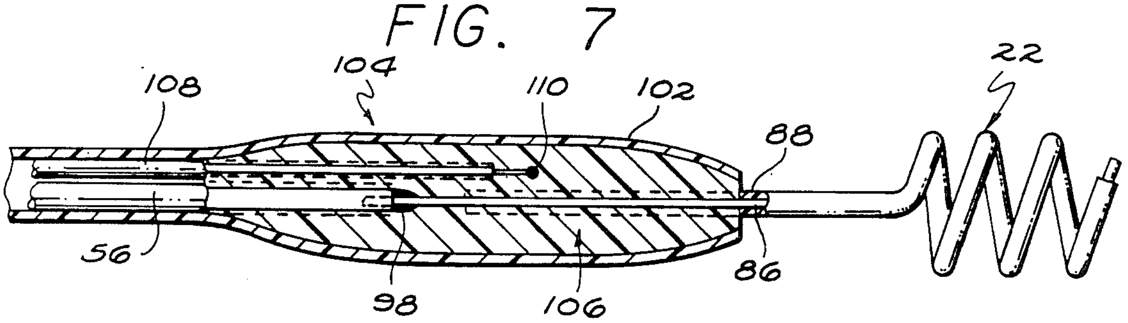
FIG. 8
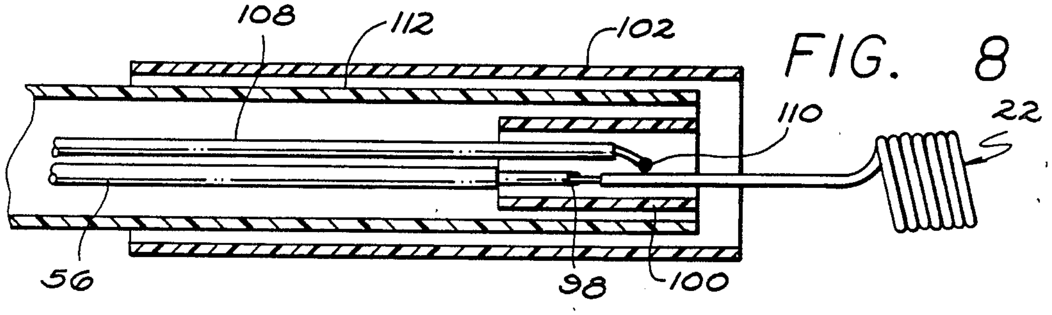
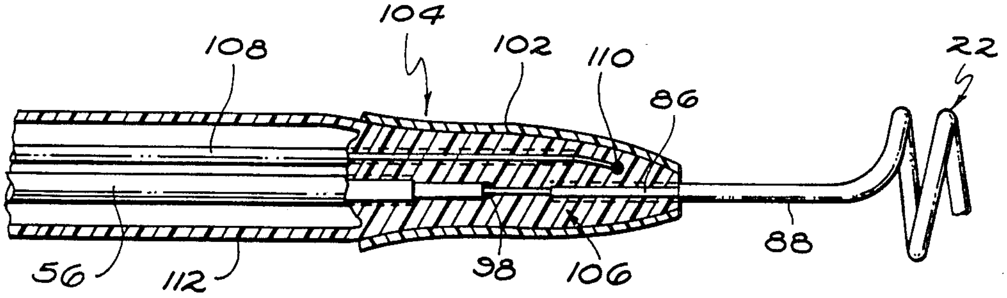
FIG. 9

METHOD OF CONNECTING NON-CONTAMINATING FLUID HEATING ELEMENT TO A POWER SOURCE

BACKGROUND OF THE INVENTION

This invention relates generally to contamination-free fluid heating systems, and, more specifically, the a non-contaminating fluid heater and method of connecting the heating element to a power source.

With the advent of microchip technology, there has developed a need for systems which utilize contaminant-free fluids. For example, during the manufacturing of computer microchips, acids may be used for etching the microchips and water may be used for rinsing. Because of the very small scale of today's microcircuits and the high manufacturing tolerances required, virtually any impurity in the etching or rinsing fluid can result in defective parts and wasted resources.

To provide the necessary high-purity fluid for use in such systems, filtering processes are employed to remove virtually all contaminants and, effectively, de-ionize the fluid. The systems are further designed to prevent contact between the contaminant-free fluid and any substance which would tend to corrode in the presence of the fluid, causing impurities to be reintroduced.

Many systems require the contaminant-free fluid to be heated above ambient temperatures to meet required design and manufacturing parameters. Heater manufacturers have sought to design acceptable devices which are thermally efficient, responsive to fluid flow changes, and capable of long life. Although most plastic materials tend to be good thermal insulators and therefore seemingly inappropriate for some uses in heating systems, most modern heaters for use in microchip manufacturing systems must employ plastics to shield the contaminant-free fluid from the metallic heating element, lead wires and the like.

Because thermally insulative material must be used to shield the metallic portion of the heating element from the contaminant-free fluid, much more power is utilized by the heater than would be required in the absence of the insulative shielding. Therefore, the heating coil must usually remain completely submerged within the heated fluid or it will overheat and burn. Further, the electrical connection between the lead wires and the heating element is usually submerged into the heated fluid and subjected to its sometimes corrosive nature.

Attempts have been made to provide a seal about the electrical connection between the lead wires from the power source and the heating element, to protect that connection from the heated fluid and to prevent any leaching of contaminants from the wires into the fluid. The failure to adequately protect this electrical connection has been a problem area for heater manufacturers and users. More specifically, imperfections in sealing techniques often result in failure of the system (exposure of the metallic portion of the heating element or lead wire), requiring repurification of the fluid and replacement of the heater. The useful life of many prior heaters and heating systems is determined primarily by the lifetime of the environmental sealing means surrounding this electrical connection.

Accordingly, there has been a need for a novel non-contaminating fluid heater capable of use with a broad spectrum of fluids, in a variety of operational configurations, and within a broad range of temperatures. Additionally there exists a need for such a fluid heater which can efficiently and economically heat and maintain the fluid passing therethrough at a desired temperature. Further, a fluid heater is needed which is durable and capable of long, sustained use in harsh environments. Moreover, a novel method of connecting the heating element to a power source is needed which can from a highly reliable and durable environmental seal. The present invention fulfills these needs and provides other related advantages.

SUMMARY OF THE INVENTION

The present invention resides in an improved non-contaminating fluid heater utilizing a novel method of connecting lead wires from the power source to the heating element. The fluid heater comprises, generally, a heater body having a fluid inlet generally adjacent a fluid outlet, and means for channelling the fluid received into the heater body through the inlet to a point substantially distally spaced from the fluid outlet. A resistance heating element is wound about the channelling means, and connected to lead wires passing through the heater body.

In one preferred form, the heater body is generally cylindrical in shape and configured so the inlet and outlet pass through its upper end. The fluid channelling means comprises a tube extending from the inlet generally through the center of the heater body and terminating adjacent the lower end. At least one plenum plate circumscribes the lower end of the central tube to increase turbulence of the fluid on its passage from the outlet end of the tube to the heater body outlet. The heating element is helically wound substantially the length of the central tube, and is connected to lead wires passing through the heater body. An environmental seal for the connection between the lead wires and the heating element comprises a mass of thermoplastic material fused to similar materials jacketing the wires and the heating element. Further, wire passage means are provided which permit passage of the lead wires into the heater body while also preventing fluid leakage along the lead wire passage routes.

More specifically, the wire passage means includes a dual threaded plug having a first threaded portion engaging a wall of the fluid heater, a second threaded portion projecting outwardly from the wall, a plug central passageway dimensioned for snug passage of a lead wire therethrough, and a compression flange extending outwardly from the second threaded portion and surrounding an end of the central passageway. A cap is provided having an internal threaded portion for engaging the second threaded portion of the dual threaded plug, a cap central passageway in alignment with the plug central passageway, and a retaining well in alignment with the compression flange. Finally, an O-ring is positioned within the retaining well which is compressed as the cap is tightened onto the dual threaded plug.

The method for connecting the lead wires to the heating element comprises, generally, application of an extruded jacket of PFA (Perfluoroalkoxy) Teflon to the resistance heating element, application of a first jacket of colored PFA Teflon to the lead wire, and further application of an additional jacket of uncolored PFA Teflon over the colored jacket. An electrically conductive, low resistance connection is formed between the heating element and the lead wire by drilling a hole longitudinally into the end of the lead wire, inserting the adjacent end of the heating element into the hole, and brazing the junction.

A sleeve of corrosion-resistant thermoplastic material, preferably FEP (Perfluoroethylenepropylene) Teflon, is placed over the connection between the heating element and the lead wire. This sleeve is, in turn, surrounded with a jacket of shrink tubing (preferably TFE (Tetrafluoroethylene) shrink tubing), and the entire assembly is heated sufficiently to melt the PFA and FEP materials, and cause the shrink tubing to squeeze and fuse the FEP and PFA materials together. Such fusion creates a hermetic environmental seal surrounding the connection between the lead wire and the heating element.

If desired, a thermocouple may be placed alongside the lead wire and situated so the thermocouple junction is located adjacent the thermoplastic PFA Teflon jacket surrounding the heating element. As the assembly is heated, the thermocouple also will be encased within this highly reliable environmental seal.

In some instances it is desirable to provide a second sleeve of FEP Teflon tubing between the shrink tubing and the first sleeve of FEP teflon tubing. This is especially desirable when a thermocouple is inserted into the seal area and a uniform diameter tube is needed for passage through the wire passage means.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is an external and somewhat schematic view of a fluid heater and related components embodying the present invention;

FIG. 2 is an enlarged, elevational and partially sectional view of the fluid heater of FIG. 1, illustrating the configuration of a resistance heating element within the heater body and the manner in which lead wires pass through the heater body for connection with the heater element;

FIG. 6 is similar to FIG. 4 but additionally shows the positioning of a thermocouple between the sleeve of FEP Teflon and the heating element;

FIG. 7 illustrates the environmental seal formed by heating the assembly illustrated in FIG. 6;

FIG. 8 is similar to FIG. 6 but additionally shows a second sleeve of thermoplastic FEP Teflon material between the shrink tubing and the first sleeve of FEP Teflon material, this second sleeve extending beyond the end of the shrink tubing (and the heated area) to provide a rigid tube-like encasement for the thermocouple and the lead wire;

FIG. 9 illustrates the environmental seal formed by heating the assembly illustrated in FIG. 8; and FIG. 10 is an enlarged sectional view of a connector assembly illustrated in FIGS. 1 and 2, showing the manner in which the lead wires are permitted passage through the heater body without causing fluid leakage.

DETAILED DESCRIPTION OF THE PREFERRED EMBODIMENT

Figure 3:
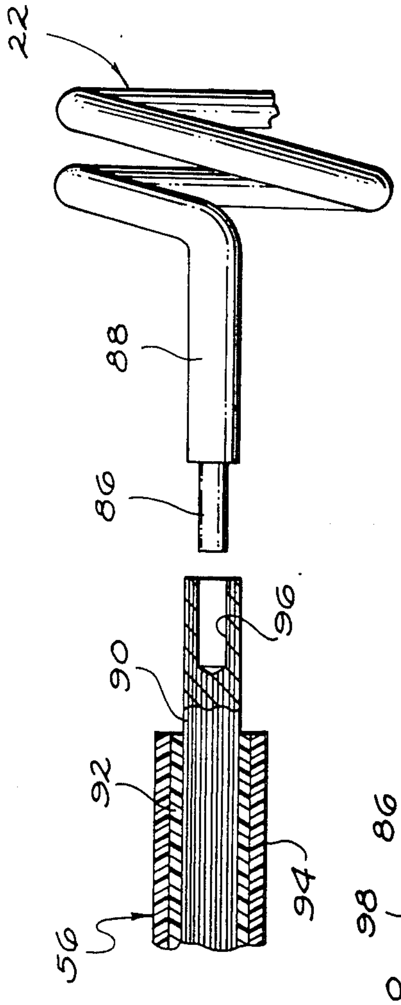
FIG. 3 illustrates the first steps in a method of connecting the heating element to a lead wire, the heating element being shown as covered with a layer of thermoplastic material, and the lead wire shown in section to illustrate two jackets of thermoplastic materials surrounding the stranded lead.

As shown in the drawings for purposes of illustration, the present invention is concerned with an improved fluid heater, generally designated in FIGS. 1 and 2 by the reference number 20, and a method of connecting a resistance heating element 22 to a power source 24. The improved fluid heater 20 is intended for use with contaminant-free fluids ranging in temperature from cryogenic applications to systems for heating fluids in excess of 200° C. When constructed utilizing the methods more particularly set forth below, the fluid heater 20 forms a durable apparatus capable of long, sustained use in harsh environments. Further, means have been provided for accurately sensing the temperature of the resistance heating element 22, allowing greater and more responsive control over the fluid temperature throughout changing flow conditions.

In accordance with the present invention, and as illustrated best in FIGS. 1 and 2, the fluid heater 20 includes a heater body 26 mounted to a board 28 by means of suitable brackets 30 and bolts 32. The heater body is constructed of a cylindrical outer PVDF (Polyvinylidene Fluoride) encasement 34 having a PVDF top end plate 36 fused to its upper end, and a similar PVDF bottom end plate 38 fused to its bottom end.

The top end plate 36 is provided several tubes which form passageways allowing access to the interior of the heater body 26. An inlet tube 40 channels inlet fluids through the top end plate 36 into a central tube 42 extending downwardly through the center of the heater body 26 to a discharge point near the bottom end plate 38. An outlet tube 44 is situated generally adjacent the inlet tube 40 to maximize the fluid flow travel path through the heater body 26 for maximum fluid exposure to the resistance heating element 22. A third access tube 46 faciliates placement of any one of several desirable sensors utilized for controlling power input to the resistance heating element 22. For example, this third access tube 46 could be utilized to place a dual element thermocouple (not shown) or a fluid level sensor (not shown) into the heated fluid. Notwithstanding the particular function of the various access tubes 40, 44 and 46, each is equipped with a suitable connector 48 which permits attachment to other tubes or apparatus while preventing fluid leakage.

The resistance heating element 22 is helically wound about the central tube 42 substantially its entire length, and is positioned between a pair of PVDF plenum plates 50 and 52. These plenum plates 50 and 52 circumscribe, respectively, upper and lower portions of the central tube 42 to help insure substantially uniform flow of fluid past the resistance heating element 22 as it flows from the lower end of the central tube 42 upwardly toward the outlet tube 44. A PVDF anchor 54 provides a means of attaching the upper portion of the resistance heating element 22 to the upper plenum plate 50.

Like the top end plate 36, the bottom end plate 38 is provided several passageways which, as shown in the drawings, are provided to permit insertion of two lead wires 56 and a ground wire 58 into the heater body 26. Although all three of these wires are shown in FIG. 1 as coming from the power source 24, the ground wire 58, of course, could be grounded in any suitable manner. To permit passage of these wires 56 and 58 through the bottom end plate 38 without causing any fluid leakage therethrough, a connector assembly 60 is provided for each wire. As illustrated in FIG. 10, the connector assembly 60 includes a dual threaded plug 62 having a first threaded portion 64 which threadably engages the bottom end plate 38, and a second threaded portion 66 which projects outwardly from the bottom end plate and is separated from the first threaded portion by a hex gripping portion 68. A plug central passageway 70, dimensioned to snuggly accommodate a wire 56 or 58, extends from one end of the dual threaded plug 62 to the other. A compression flange 72 extends outwardly from the second threaded portion 66 in a manner surrounding an end of the plug central passageway 70.

The connector assembly 60 further includes a cap 74 having an internal threaded portion 76 designed to engage the second threaded portion 66 of the dual threaded plug 62. A cap central passageway 78, in alignment with the plug central passageway 70, is provided, as well as a retaining well 80 in alignment with the compression flange 72.

In use, a wire is snuggly positioned within the central passageways 70 and 78 of the plug and cap, and the first threaded portion 64 is threaded into the bottom end plate 38 until the hex gripping portion 68 lies adjacent that end plate. An O-ring 82 is positioned within the retaining well so that as the cap 74 is tightened over the second threaded portion 66, the compression flange 72 presses against the O-ring 82 to create a fluid seal surrounding the wire.

The connector assembly 60, like the other components of the fluid heater 20, is constructed of materials which are inert and corrosion-resistant to the fluid being heated. In this manner, the contaminant-free nature of the fluid can be reliably maintained. The lead wires 56, the ground wire 58 and the resistance heating element 22 are no exception. They too must only present fluid contacting surfaces which are inert and corrosion-resistant to the fluid being heated. In this regard, the wires 56 and 58 and the resistance heating element 22 are preferably jacketed with at least one layer of PFA (Perfluoroalkoxy) Teflon material. The connections between the lead wires 56 and the resistance heating element 22 must further be encased within an environmental seal capable of resisting the corrosive nature of the fluid being heated.

With regard to the ground wire 58, it is sometimes necessary to place a metallic component in contact with the heated fluid for safety purposes. To satisfy this requirement, preferably only a tantalum tip 84 is exposed to the heated fluid. It has been found that such material is inert to most heated fluids, with the exception of hydroflouric solutions. In such cases, a plantinum tip is utilized for grounding the fluid within the fluid heater 20.

Figure 4:
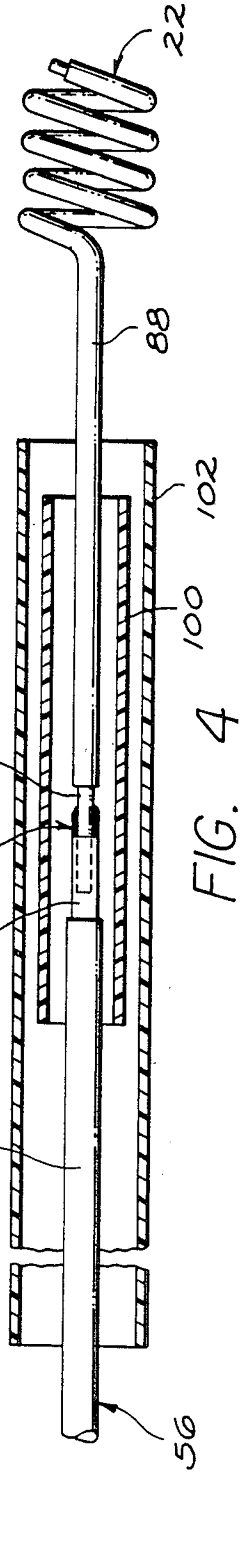
FIG. 4 illustrates the connection of the lead wire to the heating element, the position positioning of a sleeve of thermoplastic FEP Teflon, and also the positioning of TFE Teflon shrink tubing, prior to forming an environmental seal.
Figure 5:
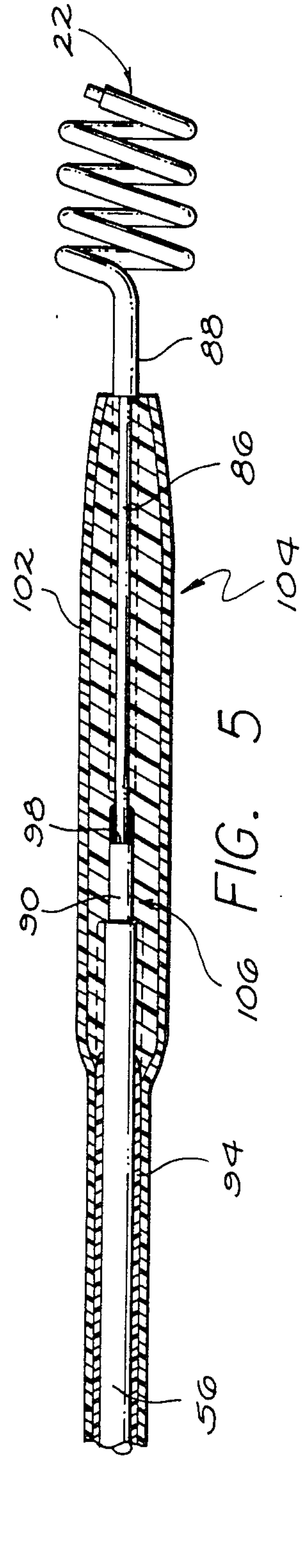
FIG. 5 illustrates the environmental seal formed by heating the assembly illustrated in FIG. 4 sufficiently to melt the thermoplastic materials and activate the shrink tubing.

The preferred method of connecting the lead wires 56 to the resistance heating element 22 and forming an acceptable environmental seal is illustrated in FIGS. 3–5. To begin, a solid core resistance wire 86 of proper resistance value per foot to achieve approximately 20 watts per square inch of surface area is selected. A 0.030 inch extruded jacket 88 of PFA Teflon is applied to the wire 86 in a manner insuring that the jacket is pulled down tightly onto the wire to maximize heat transfer. Voids or air bubbles between the resistance wire 86 and the jacket 88 could cause hot spots and lead to over-temperature failure of the protective jacket 88. A clean wire 86 with minimum pits is required.

The lead wire 56 is preferably a 12-guage stranded, silver plated copper wire 90 having a first jacket 92 of 0.015 inch colored PFA Teflon applied. This colored jacket 92 is applied to satisfy electrical color code regulations for 100 VAC and 200+VAC heaters. Subsequently, a second jacket 94 of 0.015 inch uncolored PFA Teflon is applied over the first jacket 92 to prevent leaching of the color from the first jacket into the heated fluid.

The connection between the stranded wire 90 and the solid core resistance wire 86 must be mechanically strong and low in electrical resistance to prevent overheating of the environmental seal area. This is preferably accomplished by drilling a hole 96 longitudinally into the stripped end of the stranded wire 90, and inserting the stripped end of the solid core resistance wire 86 into it. This junction 98 is then silver brazed with a minimal amount of brazing material (only enough is used to cause a smooth transition between the larger stranded wire 90 to the resistance wire 86).

After the electrically conductive, low resistance junction 98 is formed, a sleeve 100 of corrosion-resistant, thermoplastic material is placed over this junction and adjoining portions of the thermoplastic, PFA jackets 88 and 94. It is presently preferred that this sleeve 100 be FEP (Perfluoroethylenepropylene) Teflon tubing. Next, this sleeve 100 is surrounded by a segment of non-thermoplastic, thermally activated shrink tubing 102, preferably formed of TFE (Tetrafluoroethylene) Teflon material. The configuration of these assembled components is illustrated in FIG. 4.

To create an environmental seal 104 as illustrated in FIG. 5, the temperature surrounding the junction 98 must be elevated to a point causing the thermoplastic PFA and FEP materials to melt, and further to activate the shrink tubing 102. The PFA jackets 88 and 94, and the FEP sleeve 100 become a pasty liquid upon melting, and as the TFE shrink tubing 102 becomes smaller, it squeezes the FEP and PFA thermoplastic materials together, causing them to fuse and produce a hermetic Teflon seal. Typically, the temperature surrounding the junction 98 must be elevated to approximately 620° F., or the gel temperature of the TFE shrink tubing, and once the fusion of the thermoplastic materials is complete, the junction may be cooled to ambient temperatures. The environmental seal 104 depicted in FIG. 5 permits the junction 98 of the lead wire 56 and the resistance heating element 22 to be placed in a caustic or corrosive solution for long periods of time without contaminating the solution or failure of the connection due to corrosion.

Upon completion of the fusion process, the end of the shrink tubing 102 surrounding the resistance heating element 22 must be carefully inspected to insure that there is no void or unfilled portion within the end of the shrink tubing adjacent the resistance heating element. If a "bell" of shrink tubing 102 is left unfilled by fused thermoplastic materials 106, this bell must be trimmed from the remainder of the shrink tubing 102. If this is not done, air could be trapped within the bell portion, creating a hotspot where failure of the PFA jacket 88 could occur.

Sometimes it is desirable to have a thermocouple 108 positioned in the proximity of the junction 98 adjacent the resistance heating element 22. As shown in FIG. 6, this can be accomplished by simply running a PFA Teflon jacketed thermocouple 108 along the lead wire 56 inside the sleeve 100, and positioning the thermocouple junction 110 adjacent the PFA jacket 88 surrounding the solid core resistance wire 86. The environmental seal 104 is formed in an identical manner as described above, the only difference being that the PFA jacket for the thermocouple 108 will also melt and fuse with the jackets 88 and 94, and the sleeve 100. An environmental seal 104 surrounding the junction 98 and the thermocouple 108 is illustrated in FIG. 7.

When a thermocouple 108 is utilized, it may be preferable to increase the amount of thermoplastic material available for forming the environmental seal 104. As illustrated in FIG. 8, this can be accomplished by including a second sleeve 112 of FEP Teflon material between the shrink tubing 102 and the first sleeve 100. The configuration of materials illustrated in FIG. 8, and the resultant environmental seal 104 illustrated in FIG. 9, are specifically utilized when the thermocouple 108 is intended to be inserted through the connector assembly 60 together with a lead wire 56. In such a situation, it is important that a relatively uniform cylindrical outer surface be provided for snug retention within the central passageways 70 and 78 to prevent fluid leakage. FIG. 9 illustrates how the environmental seal 104 can be formed about the junction 98 and thermocouple 108, and yet leave an unmelted and unfused portion of the second sleeve 112 which extends away from the resistance heating element 22 in a manner providing the uniform diameter sleeve needed to insure that fluids will not be allowed to leak past the connector assembly 60.

From the foregoing it should be understood that the fluid heater 20 has the capability of effectively heating contaminant-free fluids in an effective manner for a prolonged period of time. The specific construction of the heater body 26 and its interior components insures uniform flow of fluid (as indicated by the arrows in FIG. 2) past the resistance heating element 22, and the environmental seals between the lead wires 56 and the resistance heating element give durability to a portion of the system which has previously been considered a "weak link".

Although a particular embodiment of the invention has been described in detail for purposes of illustration, various modifications may be made without departing from the spirit and scope of the invention. Accordingly, the invention is not to be limited, except as by the appended claims.

I claim:

1. A method of forming an environmental seal about a connection between a lead wire and a resistance heating element for use in a fluid heating system, the steps comprising:

applying a corrosion-resistant thermoplastic material to the exterior of the lead wire along at least a portion thereof adjacent the connection;

applying a corrosion-resistant thermoplastic material to the exterior of the heating element along at least a portion thereof adjacent the connection;

placing a sleeve of corrosion-resistant thermoplastic material about the connection so it overlaps at least portions of the lead wire and the heating element;

placing a thermocouple between the sleeve and the heating element;

surrounding the sleeve with means for squeezing the thermoplastic materials against the lead wire and the heating element;

melting the thermoplastic materials surrounding the connection; and activating the squeezing means, causing it to fuse the thermoplastic material together, such fusion creating a hermetic environmental seal surrounding the connection.

2. A method as set forth in claim 1, wherein the thermoplastic materials utilized are flouropolymers.

3. A method as set forth in claim 1, wherein the squeezing means comprises thermally activated TFE shrink tubing.

4. A method as set forth in claim 1, including the step of providing a second sleeve of corrosion-resistant thermoplastic material between the squeezing means and the first sleeve.

5. A method as set forth in claim 1, including the step of placing a thermocouple between the sleeve and the heating element.

6. A method of connecting a lead wire to a heating element for use in a fluid heating system, the steps comprising:

providing a resistance heating element having an extruded jacket of PFA Teflon applied thereto for covering the resistance heating element with a layer of corrosion-resistant thermoplastic material;

providing a lead wire having at least a portion covered with a first jacket of colored PFA Teflon and a second, uncolored jacket of PFA Teflon over the colored jacket;

forming an electrically conductive, low resistance connection between an end of the heating element and an end of the lead wire adjacent the portion covered with the jackets of PFA Teflon;

placing a sleeve of corrosion-resistant thermoplastic material about the connection between the heating element and the lead wire;

surrounding the sleeve with thermally activated shrink tubing;

melting the thermoplastic materials surrounding the connection between the lead wire and the heating element; and heating the shrink tubing, causing it to squeeze and fuse the thermoplastic materials together, such fusion creating a hermetic seal surrounding the connection between the lead wire and the heating element.

7. A method as set forth in claim 6, wherein the step of forming an electrically conductive, low resistance connection includes drilling a hole longitudinally into the end of the lead wire, inserting the adjacent end of the heating element into the hole, and brazing the junction.

8. A method of connecting a lead wire to a heating element for use in a fluid heating system, the steps comprising:

providing a resistance heating element which is covered with a layer of corrosion-resistant thermoplastic material;

providing a lead wire having at least a portion covered with a jacket of corrosion-resistant thermoplastic material;

forming an electrically conductive, low resistance connection between an end of the heating element and an end of the lead wire adjacent the portion covered with the jacket of corrosion-resistant thermoplastic material;

placing a sleeve of corrosion-resistant thermoplastic material about the connection between the heating element and the lead wire;

placing a thermocouple between the sleeve and the heating element;

surrounding the sleeve with thermally activated shrink tubing;

melting the thermoplastic materials surrounding the connection between the lead wire and the heating element; and heating the shrink tubing, causing it to squeeze and fuse the thermoplastic material together, such fusion creating a hermetic seal surrounding the connection between the lead wire and the heating element.

9. A method as set forth in claim 8, wherein the thermocouple includes at least two leads which are covered with a jacket of thermoplastic material and extend away from the connection of the heating element and the lead wire generally adjacent the lead wire, and wherein the thermocouple junction is situated generally adjacent a portion of the thermoplastic material covering the heating element.

10. A method as set forth in claim 8, including the step of removing any portion of the shrink tubing not filled by thermoplastic materials after the melting and heating steps.

11. A method as set forth in claim 8, including the step of providing a second sleeve of corrosion-resistant thermoplastic material between the shrink tubing and the first sleeve.

12. A method as set forth in claim 11, wherein the second sleeve is longer than the shrink tubing and extends past an end of the shrink tubing surrounding the lead wire.

13. A method as set forth in claim 11, wherein the thermoplastic materials covering the heating element, the lead wire and the thermocouple are formed of PFA Teflon, the sleeves are formed of FEP Teflon, and the shrink tubing is a TFE material.

* * * * *

UNITED STATES PATENT AND TRADEMARK OFFICE
CERTIFICATE OF CORRECTION

PATENT NO. : 4,756,781

DATED : July 12, 1988

INVENTOR(S) : David R. Etheridge

It is certified that error appears in the above-identified patent and that said Letters Patent is hereby corrected as shown below:

In Column 2, line 6, delete the word "from" and insert therefor --form--.

In Column 3, line 52, delete the word "position."

In Column 8, delete claim 5.

Signed and Sealed this

Twenty-second Day of November, 1988

*Attest:*

DONALD J. QUIGG

*Attesting Officer*

*Commissioner of Patents and Trademarks*